United States Patent
Karr

(10) Patent No.: US 11,502,363 B2
(45) Date of Patent: Nov. 15, 2022

(54) TERMINAL RAIL CONNECTOR ON BATTERY STACK SIDES FOR BUS BAR MODULE REMOVAL

(71) Applicant: TOYOTA MOTOR ENGINEERING & MANUFACTURING NORTH AMERICA, INC., Plano, TX (US)

(72) Inventor: Eric J. Karr, Canton, MI (US)

(73) Assignee: TOYOTA MOTOR ENGINEERING & MANUFACTURING NORTH AMERICA INC., Plano, TX (US)

(*) Notice: Subject to any disclaimer, the term of this patent is extended or adjusted under 35 U.S.C. 154(b) by 183 days.

(21) Appl. No.: 16/749,118

(22) Filed: Jan. 22, 2020

(65) Prior Publication Data

US 2021/0226187 A1  Jul. 22, 2021

(51) Int. Cl.
*H01M 50/20* (2021.01)
*H01M 50/502* (2021.01)
*H01M 50/543* (2021.01)
*H01M 10/48* (2006.01)

(52) U.S. Cl.
CPC ......... *H01M 50/20* (2021.01); *H01M 10/482* (2013.01); *H01M 10/486* (2013.01); *H01M 50/502* (2021.01); *H01M 50/543* (2021.01); *H01M 2220/20* (2013.01)

(58) Field of Classification Search
CPC ........ H01M 6/00; H01M 10/00; H01M 50/00; H01M 12/00; H01M 50/20; H01M 50/502; H01M 50/543; H01M 10/482; H01M 10/486; H01M 2220/20; H01M 50/166; H01M 50/102; H01M 50/375; H01M 50/552; H01M 50/507; H01M 50/202
See application file for complete search history.

(56) References Cited

U.S. PATENT DOCUMENTS

| | | | |
|---|---|---|---|
| 6,489,747 B2 * | 12/2002 | Abe ................. | H01M 50/502 320/112 |
| 10,797,275 B2 * | 10/2020 | Ito .................. | H01M 50/147 |
| 2014/0127535 A1 | 5/2014 | Schaefer | |
| 2016/0197383 A1 * | 7/2016 | DeKeuster ......... | H01M 50/256 429/90 |
| 2017/0125772 A1 * | 5/2017 | Leung ............... | H01M 50/502 |
| 2018/0034021 A1 * | 2/2018 | Yamamoto .......... | H01M 50/20 |

(Continued)

FOREIGN PATENT DOCUMENTS

| | | | |
|---|---|---|---|
| EP | 3316386 | | 5/2018 |
| JP | 2013120690 A | * | 6/2013 |
| KR | 101799542 | | 11/2017 |

*Primary Examiner* — Brian R Ohara
*Assistant Examiner* — Emily Elizabeth Freeman
(74) *Attorney, Agent, or Firm* — Sheppard, Mullin, Richter & Hampton LLP; Hector A. Agdeppa; Daniel N. Yannuzzi

(57) ABSTRACT

A battery pack assembly made up of a battery stack case housing a plurality of battery cells abutting each other is provided for powering a vehicle, such as an electric/hybrid vehicle, and/or a vehicle's electrical components. Each battery cell may be oriented such that their respective terminals alternate in polarity. The respective terminals of each battery cell may be shaped that the terminals frictionally engage a corresponding terminal connector on either side of the battery stack case, and disengage from a corresponding terminal easily. This allows individual battery cells to be replaced/removed without having to remove the entire battery stack.

19 Claims, 9 Drawing Sheets

(56) References Cited

U.S. PATENT DOCUMENTS

2018/0138484 A1 5/2018 Choi
2018/0337387 A1* 11/2018 Shoji .................. H01M 50/507
2019/0260099 A1 8/2019 Eun-Ah

* cited by examiner

TERMINAL RAIL CONNECTOR ON BATTERY STACK SIDES FOR BUS BAR MODULE REMOVAL

TECHNICAL FIELD

The present disclosure relates generally to a battery pack assembly for use in, e.g., a vehicle, in which the battery pack assembly comprises battery cells having terminals configured in such a way that removal of a bus bar module from the battery cells/battery pack assembly can be performed quickly and efficiently.

DESCRIPTION OF RELATED ART

Vehicles, such as electric vehicles where drive power is provided by one or more motor generators, internal combustion engine (ICE) vehicles, and hybrid electric vehicles (HEVs) (a combination of the two) require electric energy to power the one or more motor generators (MGs), power one or more electrical components, etc. This electric power is typically provided by one or more batteries having terminals operatively connected to those components, motor generators, etc.

BRIEF SUMMARY OF THE DISCLOSURE

In accordance with one embodiment, a battery pack assembly may comprise a battery stack case, and a battery stack. The battery stack may comprise a plurality of battery cells configured such that each of the plurality of battery cells substantially abuts at least one neighboring battery cell, the battery stack being housed within the battery stack. Each of the plurality of battery cells comprises two terminals shaped such that each of the two terminals frictionally engages a corresponding terminal connector on either side of the battery stack case, and disengages from the corresponding terminal connector pursuant to movement of a battery cell into and out of the battery stack case. The movement of the battery cell, and the frictional engagement and disengagement of the two terminals occurs within the same axis. The frictional engagement effectuates distribution of electrical energy from each of the battery cells to at least one system of a vehicle within which the battery pack assembly is installed.

In some embodiment, the battery pack assembly may further comprise a hollow lid adapted to retain the battery stack within the battery stack case and effectuate airflow about the plurality of battery cells. In some embodiments, the hollow lid is removably attached to the battery stack case. Removal of the hollow lid allows for singular disengagement of the two terminals of any of the battery cells of the battery stack from their corresponding terminal connectors, and singular engagement of two terminals of a new battery cell with their corresponding terminal connectors.

In some embodiments, the battery stack case comprises two rails positioned on two sides of the battery stack case opposite each other. Each of the two rails may comprise a bus bar module through which the distribution of electrical energy from each of the battery cells occurs. Moreover, each of the two rails comprises at least one sensor detecting a temperature of one of the plurality of battery cells.

In some embodiments, each of the two rails comprises at least one sensor detecting a voltage of one of the plurality of battery cells.

In some embodiments, the bus bar module comprises a wire harness.

In some embodiments, a first of the two rails comprises a retainer portion housing each terminal connector corresponding to one of the two terminals of each of the plurality of battery cells. In some embodiments, a second of the two rails comprises a retainer portion housing each terminal connector corresponding to another one of the two terminals of each of the plurality of battery cells.

In some embodiments, each terminal connector comprises a clip adapted to receive one of each of the two terminals of each of the plurality of battery cells. In some embodiments, the clip comprises at least three sides defining a region therebetween for the receipt of the one of each of the two terminals of each of the plurality of battery cells. In some embodiments, the first and second sides of the at least three sides oriented opposite each other are convex to provide the frictional engagement. In some embodiments, the first side is shaped to maintain the frictional engagement in an axis of direction perpendicular to a direction of movement effectuating the frictional engagement.

In some embodiments, a shape of each of the two terminals of a battery cell is substantially an L-shape, wherein a first end of each of the two terminals mates with its corresponding terminal connector to effectuate the frictional engagement.

In some embodiments, each of the two terminals protrudes from an upper portion of a battery cell opposite each other along a first axis, and the first end of each of the at least two terminals mating with its corresponding terminal connector is angled along a second axis substantially perpendicular to the first axis.

In some embodiments, a first of the two terminals is wider that a second of the two terminals.

In accordance with another embodiment, a battery pack assembly may comprise a battery stack case, and a battery stack housed within the battery stack case. An upper portion of the battery stack remains exposed, the battery stack comprising a plurality of battery cells, each battery cell comprising a positive terminal and a negative terminal, wherein the positive and negative terminals of a battery case alternate along each side of the battery stack. Each of the positive and negative terminals of each of the battery cells protrudes from an upper portion of each of the battery cells and is angled towards the battery stack case. The battery stack case may further comprise a rail on opposite sides of the battery stack case, the rail comprising a plurality of terminal connectors adapted to frictionally engage each of the positive and negative terminals of each of the battery cells.

In some embodiments, the battery stack case further comprises a rigid, hollow lid adapted to retain the battery stack within the battery stack case and provide air flow to each of the battery cells.

In some embodiments, the rail further comprises a bus bar module adapted to distribute electrical energy from each of the battery cells to one or more vehicle systems.

In some embodiments, the rail further comprises at least one voltage sensor and at least one temperature sensor adapted to sense voltages and temperatures associated with each of the battery cells.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 2A:
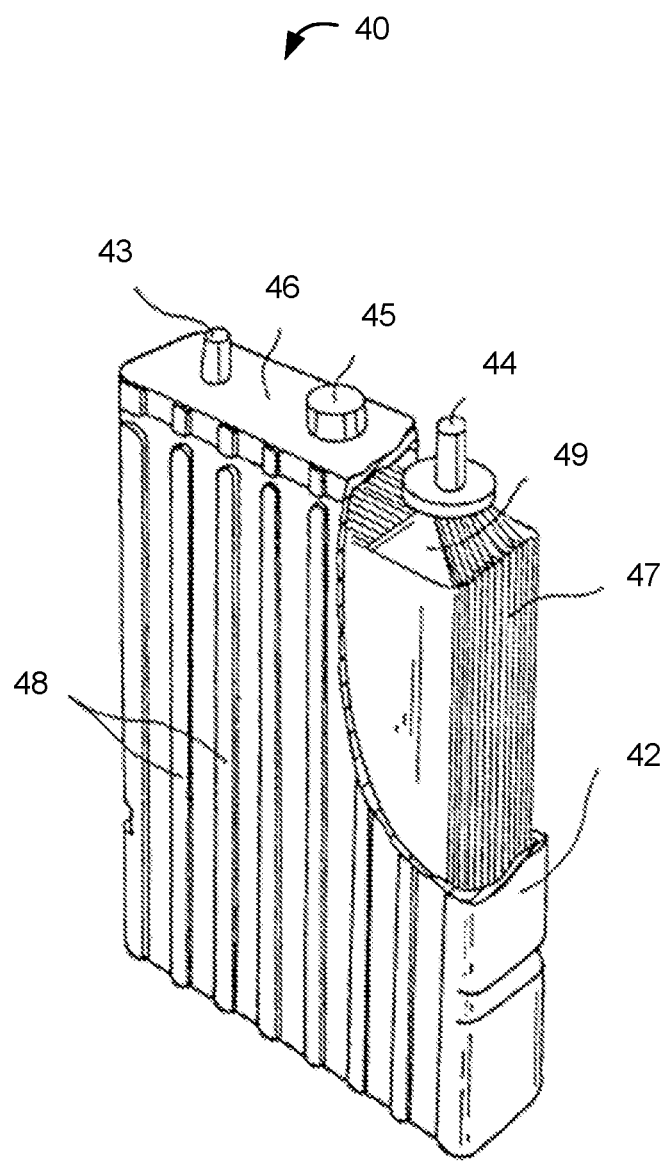
FIG. 2A illustrates an example, prior art battery.

As alluded to above, vehicles may require electrical energy to power motor generators, electrical components, and the like. For example, pure electric vehicles may have all electrical components being powered by a single, high-voltage battery pack, with power electronics used to step down the voltage for legacy 12 volt components. In hybrid electric vehicles (HEVs), a high-voltage battery pack may be used to power a motor generator, and a more traditional 12 volt electrical system (battery, alternator) to power legacy 12 volt components. Electrical energy can be provided by battery pack assemblies comprising a plurality of battery cells configured as a battery stack. Conventional battery pack assemblies may be made up battery cells, each of which has positive and negative terminals positioned or configured on a top surface of the battery cell (see, e.g., FIG. 2A). A bus bar module may be connected to these positive and negative terminals (see, e.g., FIGS. 2B, 2C) to effectuate the requisite electrical connections. However, conventional battery cell, battery pack assembly, and bus bar module configurations can make it difficult and time-consuming to remove a bus bar module from the battery pack assembly. For example, one of the plurality of battery cells making up a battery pack assembly may go bad. Given the numerous connections, and again, the configuration of conventional battery pack assemblies, user wishing to replace the single "bad" battery cell often opts to simply replace the entire battery stack or battery pack assembly.

Accordingly, various embodiments of the disclosed technology are directed to a battery pack assembly comprising a plurality of battery cells making up a battery stack positioned in a battery stack case. The battery pack assembly may further comprise a rigid, hollow lid, and a pair of rails provided on either side of the battery stack case. Each of the rails may enclose or have integrated therein, a bus bar module. In order to effectuate an electrical connection between each battery cell and the bus bar module, each battery cell is configured to have L-shaped terminals that protrude over and partially around the rail. The rail may have a plurality of terminal connectors corresponding to each L-shaped terminal, wherein each L-shaped terminal of a battery cell contacts and is held by a terminal connector (e.g., by friction).

The battery pack assembly, in accordance with various embodiments, allows a single battery cell to be removed and/or replaced with ease (compared to conventional battery pack assemblies). For example, the lid of such a battery pack assembly may simply be removed over moved out of the way, and a battery cell can be lifted up/out of the battery stack case. Similarly, a battery cell can be pushed down/into the battery stack case, and the lid can be replaced/moved back into place. Accordingly, the time and effort needed to replace an individual battery cell can be greatly reduced.

The embodiments disclosed herein may be implemented with or by any of a number of different vehicles and vehicle types. For example, a battery stack assembly configured in accordance with various embodiments disclosed herein may be used with automobiles, trucks, motorcycles, recreational vehicles and other like on-or off-road vehicles. In addition, the principles disclosed herein may also extend to other vehicle types as well. Prior to describing the details of the aforementioned battery stack assembly, it would be helpful to describe an example vehicle in which such a battery stack assembly may be implemented.

Figure 1:
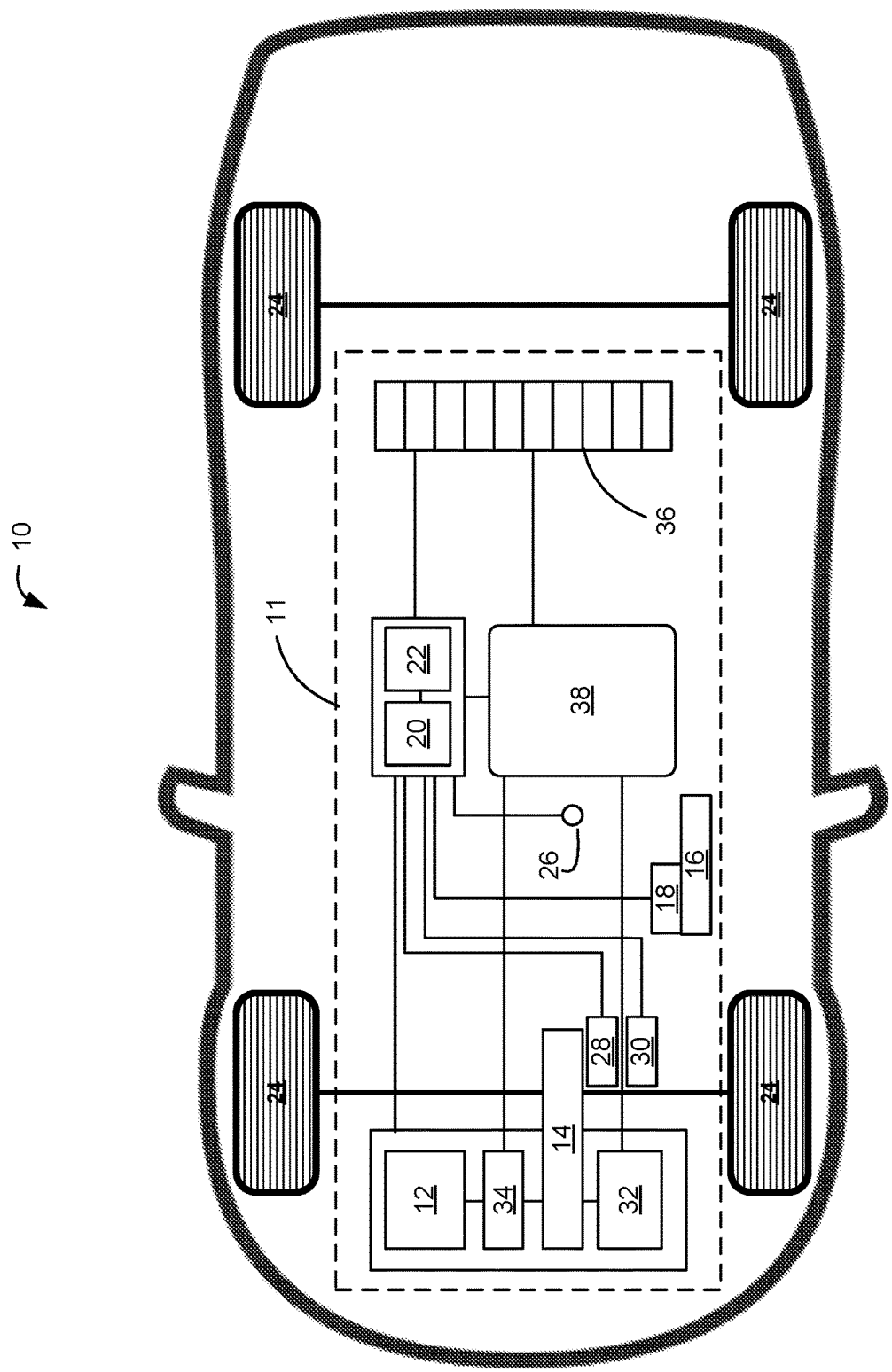
FIG. 1 is a schematic representation of an example hybrid vehicle with which embodiments of the systems and methods disclosed herein may be implemented.

An example vehicle (an HEV) in which embodiments of the disclosed technology may be implemented is illustrated in FIG. 1. As illustrated in FIG. 1, HEV 10 can include drive force unit 11 and wheels 24. Drive force unit 11 may include an engine 12, MGs 32 and 34, a battery unit 36, an inverter 38, a brake pedal 16, a brake pedal sensor 18, a transmission 14, a memory 22, a processor 20, a shifter 26, a speed sensor 28, and an accelerometer 30.

Engine 12 primarily drives the wheels 24. Engine 12 can be an ICE that combusts fuel, such as gasoline, ethanol, diesel, biofuel, or other types of fuels which are suitable for combustion. The torque output by engine 12 is received by the transmission 14. MGs 32 and 34 can also output torque to the transmission 14. Engine 12 and MGs 32 and 34 may be coupled through a planetary gear (not shown in FIG. 1B). The transmission 14 delivers an applied torque to the wheels 24. The torque output by engine 12 does not directly translate into the applied torque to the wheels 24.

MGs 32 and 34 can serve as motors which output torque in a drive mode, and can serve as generators to recharge the battery unit 36 in a regeneration mode. Battery unit 36 may be implemented as one or more batteries or other power storage devices including, for example, lead-acid batteries, lithium ion, and nickel batteries, capacitive storage devices, and so on. The electric power delivered from or to MGs 32 and 34 passes through inverter 38 to battery 36. Brake pedal sensor 18 can detect pressure applied to brake pedal 16, which may further affect the applied torque to wheels 24. Speed sensor 28 is connected to an output shaft of transmission 14 to detect a speed input which is converted into a vehicle speed by processor 20. Accelerometer 30 is connected to the body of HEV 10 to detect the actual deceleration of HEV 10, which corresponds to a deceleration torque.

Transmission 14 is a transmission suitable for an HEV. For example, transmission 14 can be an electronically controlled continuously variable transmission (ECVT), which is coupled to engine 12 as well as to MGs 32 and 34. Transmission 14 can deliver torque output from a combination of engine 12 and MGs 32 and 34. The processor 20 (which may be an electronic control unit (ECU)) controls the transmission 14, utilizing data stored in memory 22 to determine the applied torque delivered to the wheels 24. For example, processor 20 may determine that at a certain vehicle speed, engine 12 should provide a fraction of the applied torque to the wheels while MG 32 provides most of the applied torque. Processor 20 and transmission 14 can control an engine speed ($N_E$) of engine 12 independently of the vehicle speed (V).

Processor 20 may include circuitry to control various aspects of vehicle operation. Processor 20 may include, for example, a microcomputer that includes a one or more processing units (e.g., microprocessors), memory storage (e.g., RAM, ROM, etc.), and I/O devices. The processing units may execute instructions stored in memory 22 to control one or more electrical systems or subsystems in HEV 10. Processor 20 can include a plurality of ECUs such as, for example, an electronic engine control component, a powertrain control component, a transmission control component, a suspension control component, a body control component, and so on. As a further example, ECUs can be included to control systems and functions such as doors and door locking, lighting, human-machine interfaces, cruise control, telematics, braking systems (e.g., anti-lock braking system (ABS) or electronic stability control (ESC)), battery management systems, and so on. These various ECUs can be implemented using two or more separate ECUs, or using a single ECU.

Processor 20 may receive information from a plurality of sensors included in HEV 10. For example, processor 20 may receive signals that indicate vehicle operating conditions or characteristics, or signals that can be used to derive vehicle operating conditions or characteristics. These may include, but are not limited to accelerator operation amount, ACC, a revolution speed, NE, of engine 12 (engine RPM), a rotational speed, NMG1/NMG2, of MGs 32 and 34, respectively (motor rotational speed), and vehicle speed, V. These may also include brake operation amount/pressure, B, steering wheel angle/rotation, S, battery SOC (i.e., the charged amount for battery 36 detected by an SOC sensor or calculated based on voltage sensed therein, which may be implemented in a bus bar module). Accordingly, HEV 10 can include a plurality of sensors that can be used to detect various conditions internal or external to the vehicle and provide sensed conditions to processor 20. In one embodiment, such sensors may be included to detect one or more conditions directly or indirectly such as, for example, fuel efficiency, EF, motor efficiency, EMG1 and EMG2, hybrid (engine 12+MG 32 and/or MG 34) efficiency, etc.

In some embodiments, one or more of the sensors may include their own processing capability to compute the results for additional information that can be provided to processor 20. In other embodiments, one or more sensors may be data-gathering-only sensors that provide only raw data to processor 20. In further embodiments, hybrid sensors may be included that provide a combination of raw data and processed data to processor 20. Sensors may provide an analog output or a digital output. Sensors may be included to detect not only vehicle conditions but also to detect external conditions as well.

Figure 2B:
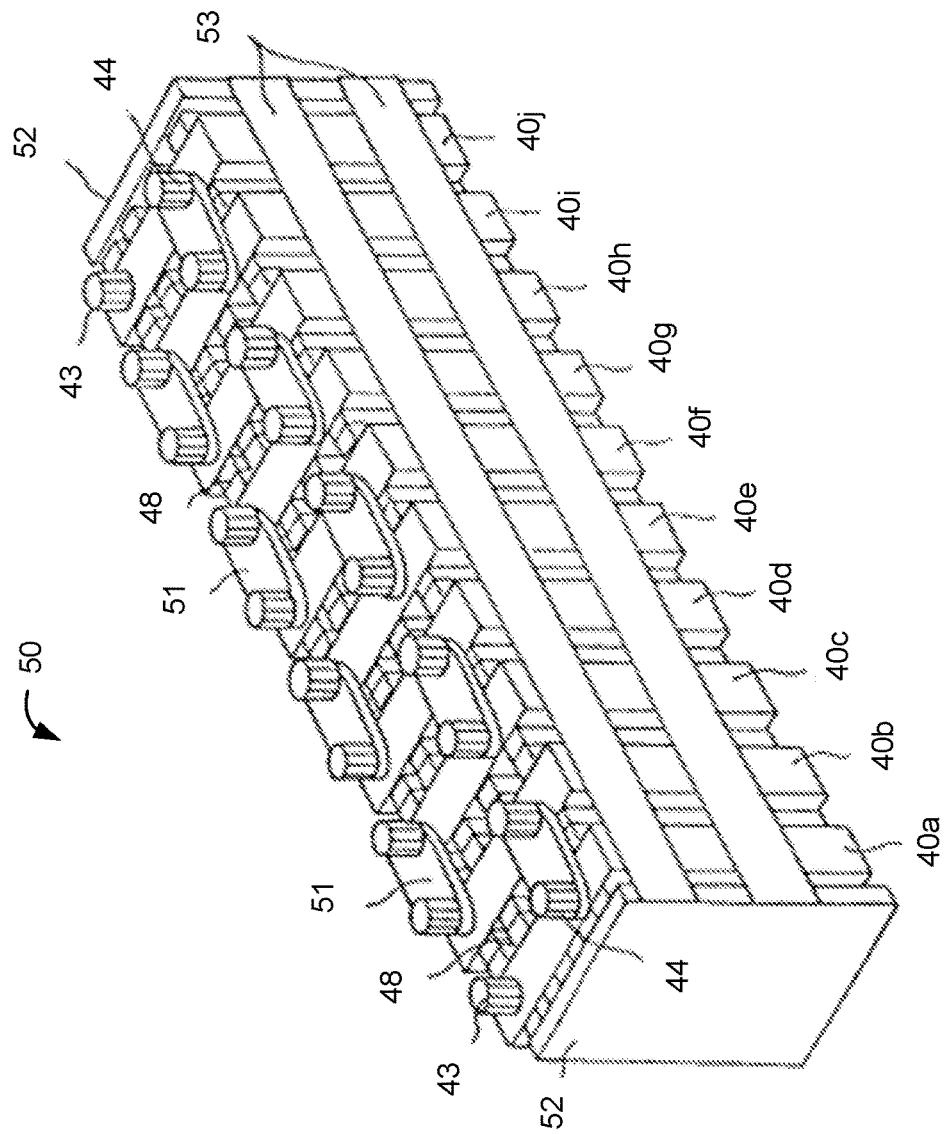
FIG. 2B illustrates an example, prior art battery stack comprising a plurality of batteries.

FIG. 2B illustrates a conventional battery stack 50 made by connecting a plurality of rechargeable batteries/battery cells, and coupling them together as one so as to obtain the necessary power. A plurality of battery cells 40*a* to 40*j* may be made of sealed, alkaline rechargeable batteries illustrated in FIG. 2B, a single battery cell 40 being illustrated in FIG. 2A, can be arranged side by side, with the long lateral walls of their battery cases 42 adjacent to each other. End plates 52 are arranged against the outside of battery cells 40*a* and 40*j* at both ends, and the group of battery cells 40*a*-40*j* and the two end plates 52 are bound together with binding bands 53 so as to couple battery cells 40*a*-40*j* together as single battery stack 50.

For battery cells 40*a*-40*j*, an electrode plate group 47, comprising positive electrode plates and negative electrode plates is layered with intervening separators, thereby constituting elements for electromotive force. Electrode plate group 47 is accommodated in a battery case 42 together with a liquid electrolyte, and the open end of the battery case 42 is closed with a lid 46 provided with a safety vent 45. From the upper end at one side of the positive electrode plates forming the electrode plate group 47, leads 49 extend upward and are connected to a positive electrode terminal 43 above them. Similarly, from the upper end of the other side of the negative electrode plates, leads 49 extend upward and are connected to a negative electrode terminal 44 above them. The positive electrode terminal 43 and the negative electrode terminal 44 are attached to the lid 46.

The positive electrode terminals 43 and negative electrode terminals 44 of coupled and neighboring battery cells are connected by connection plates 51, thereby connecting all cells 40*a*-40*j* in series. With each battery cases 42 coupled, ribs 48 (which protrude vertically from the long lateral walls of each battery case 42) abut against each other, forming coolant passages running in the vertical direction along the long lateral walls of each battery case 42 in the space between ribs 48. Battery cells 40*a*-40*j* are cooled by air flowing through these coolant passages.

Figure 2C:
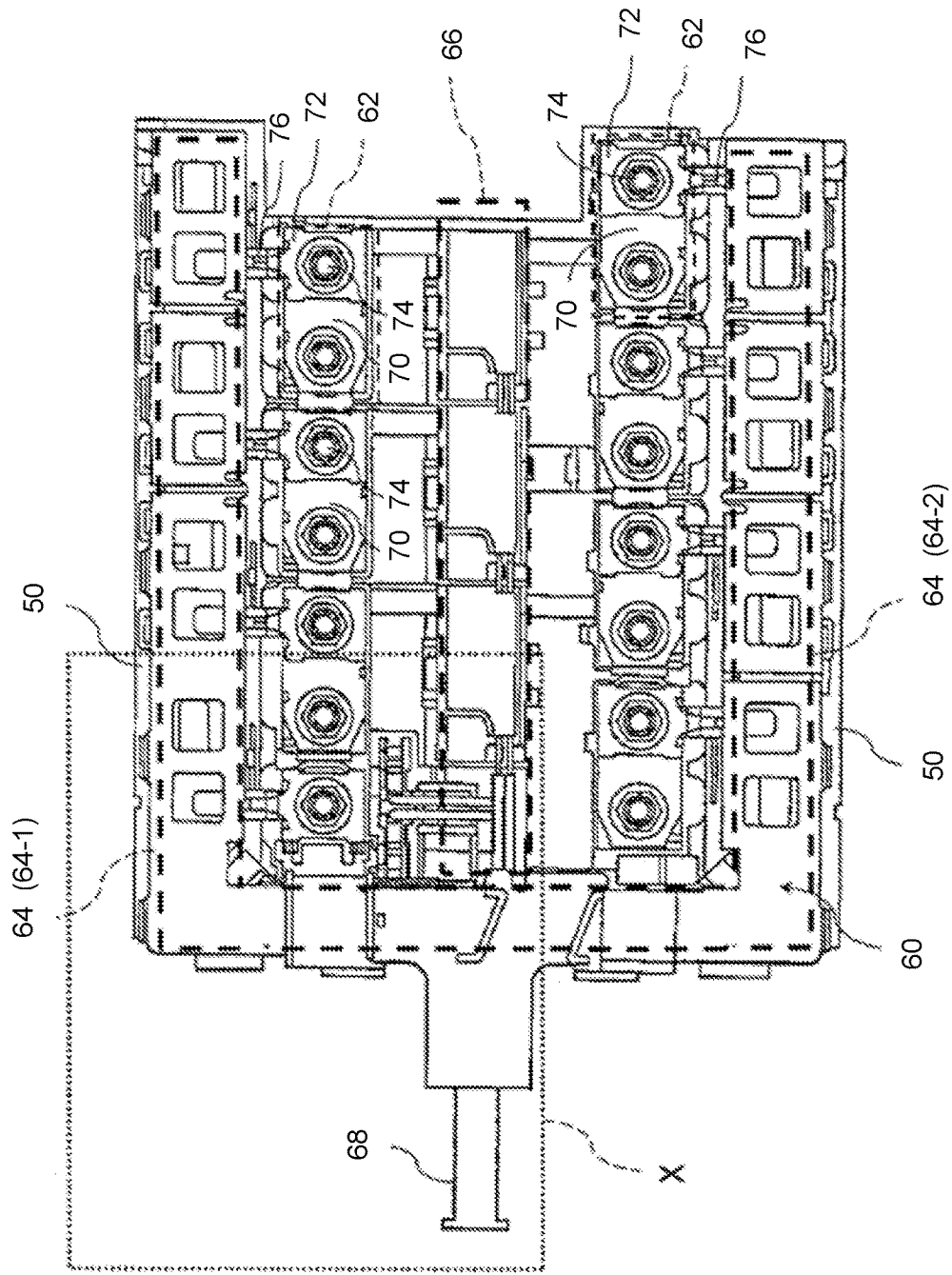
FIG. 2C illustrates an example, prior art bus bar module.

As noted above, a battery pack assembly may include bus bar module. A bus bar module can refer to a system of electrical conductors for collecting and distributing current. Thus, a bus bar module allows for the distribution of power to a vehicle's various systems/subsystems. FIG. 2C is a top view of a conventional bus bar module that may be used in conjunction with a battery stack, e.g., battery stack 50, to distribute the electrical energy from each of battery cells 40*a*-40*j*.

As illustrated in FIG. 2C, a bus bar module 60 includes a plurality of bus bar module accommodation component 62, an outer side electric wire accommodation component 64, a middle electric wire accommodation component 66, and an extraction component 68.

The bus bar module 60 can be attached to a battery stack, e.g., battery stack 50 (FIG. 2B) so as to constitute an electric power unit. The battery stack 50 may be constructed, as described above, by stacking a plurality of battery cells, e.g., battery cells 40*a*-40*j*, alternately in opposite directions such that the positive electrode and the negative electrode of two adjacent battery cells are adjacent to each other.

The bus bar module accommodation component 62 can accommodate: a bus bar 62 for electrically connecting the positive electrode and the negative electrode of two adjacent batteries; a terminal 72 conductive to an electrode of a battery cell; and a nut 74 for tightening the bus bar 62 and the terminal 72 to the electrode of a battery cell. The terminal 72 may in turn, be connected to a detection line (an electrical wire) for detecting the voltage of battery cell, e.g., each of battery cells 40a-40j. This can be considered to be a voltage sensor. A plurality of detection lines 76 connected, respectively, to each terminal 72 are routed to the outer side electric wire accommodation component 64, and are collected in the extraction component 68 through two rows of the outer side electric wire accommodation components (64-1 and 64-2). Additional detection lines (e.g., detection lines for battery temperature detection) can be collected together with detection lines 76 in the extraction component 68 through the middle electric wire accommodation component 66. It should be appreciated that the complexity of such conventional battery pack assemblies can lead to the aforementioned difficulty in removing/replacing one or more battery cells.

Figure 3A:
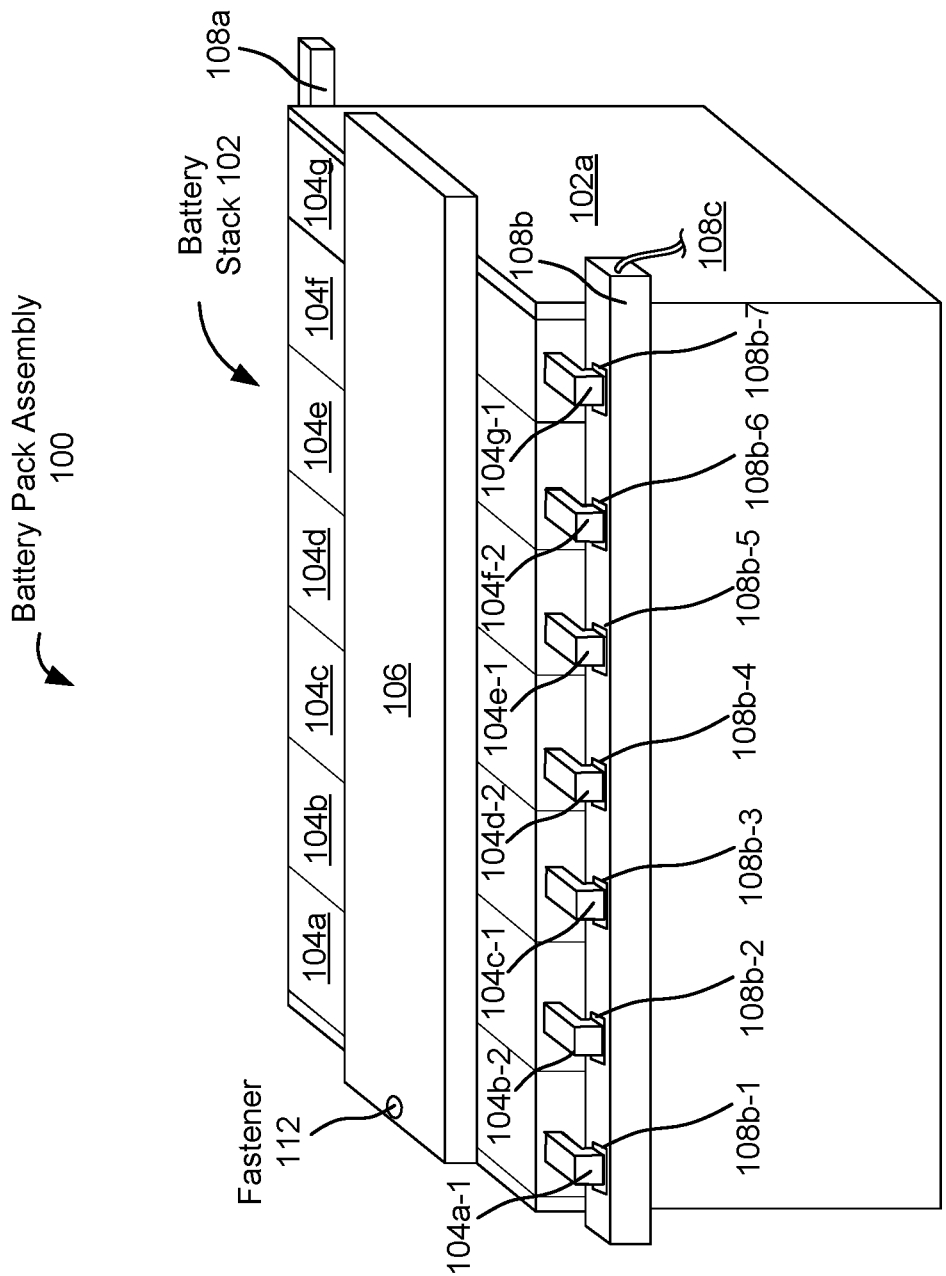
FIG. 3A illustrates an example battery pack assembly in accordance with one embodiment of the disclosed technology.

FIG. 3A is a perspective view of an example battery pack assembly 100 in accordance with one embodiment of the disclosed technology. In this embodiment, battery pack assembly 100 may include a battery stack 102. Battery stack 102 may comprise a plurality of battery cells configured in to substantially abut one another, such that at least one lateral wall of each of the battery cells is positioned approximate to or touching at least one lateral wall of an adjacent one of the battery cells. It should be understood that the abutment, as described herein, need not necessarily refer to absolute abutment of one battery cell lateral wall surface to another. For example, and as described above regarding FIG. 2A, a battery cell make comprise a battery case having ribs to allow for air flow, that nevertheless can be bundled or arranged, e.g., in parallel to one another as described herein. In this embodiment, battery stack 102 comprises seven battery cells 104a-104g. It should be noted that battery stack 102 is merely an example, and other embodiments are not limited in the number (more or less) of battery cells that may be used to make up a battery stack. For example, a battery stack may have 10, 20, 30, or more battery cells. As can be appreciated, the more battery cells that make up a battery stack, the more onerous the task of removing/replacing a single battery cell in a conventional battery stack. This is not true, however, in this and other embodiments of the disclosed technology. It should be noted that each of battery cells 104a-10g may be a lead-acid battery cell, a lithium ion battery cell, a nickel battery cell, capacitive storage devices, or other type of energy storage device, electrical or otherwise.

Battery pack assembly 100 may further comprise a battery stack case 102a that may be generally rectangular in shape, although other embodiments are not necessarily limited in shape. For example, if a need arises requiring that a battery stack comprise a plurality of battery cells stacked in a circular fashion, a battery stack case shaped to accommodate such a battery stack is contemplated herein. Battery stack 102 may be disposed in battery stack case 102a such that battery stack case 102a encompasses at least a portion of battery stack 102. One of ordinary skill in the art would know of an appropriate material(s) used to construct battery stack case 102a, e.g., a metallic material, e.g., stamped steel, aluminum, a polymer, a carbon fiber material or some combination of materials, etc.

In this embodiment, battery stack case 102a encompasses all but the upper or top portion of each of battery cells 104a-104g, leaving the area of each battery cell where its terminals are positioned exposed. That is, the terminals 104a-1, 2-104g1, 2, respectively, of each of battery cells 104a-104g are exposed to allow the terminals to operatively (electrically) contact the rails of battery stack assembly 100. It should be understood that FIG. 3 is a perspective side view of battery pack assembly 100. Accordingly, only one terminal of each of battery cells 104a-104g is shown. That is, each of battery cells 104a-104g has two terminals, one positive terminal, and one negative terminal. For example, battery cells 104a-104g may each have a second terminal (not seen in FIG. 3) protruding from the top portion of each of battery cells 104a-104g in a direction opposite that in which terminals 104a-1, 104b-2, 104c-1, 104d-2, 104e-1, 104f-2, 104g-1 protrude. As described above, the orientation of each of battery cells 104a-104g in battery stack 102 is such that the polarities of the terminals of each of battery cells 104a-104g alternate. For example, terminal 104a-1 may be a positive terminal of battery 104a, terminal 104b-1 may be a negative terminal of battery 104b, terminal 104c-1 may be a positive terminal of battery 104c, and so on.

Battery pack assembly 100 may also comprise two rails 108a and 108b, each positioned on either side of battery stack case 102a providing terminal connections (e.g., terminal connectors 108b-1, 108b-2, 108b-3, 108b-4, 108b-5, 108b-6, and 108b-7) that may frictionally engage each of terminals 104a-1, 104b-2, 104c-1, 104d-2, 104e-1, 104f-2, and 104g-1, respectively. In this way, the electrical energy provided by each of battery cells 104a-104g may be distributed to the appropriate component(s) of HEV 10, e.g., MGs 32 and 34. Though not visible in the perspective view of FIG. 3, it should be understood that rail 108a may also comprise a plurality of corresponding terminal connectors corresponding with the respective second terminal of each of battery cells 104a-104g. It should be understood that the orientation, location, and position of rail 108a and its terminal connectors are substantially similar to/the same as that illustrated in FIG. 3.

In the embodiment illustrated in FIG. 3, rails 108a and 108b have a substantially square or rectangular cross-section, but in other embodiments, can have other shapes. For example, rails 108a and 108b may be substantially circular in shape, ovoid in shape, or have some other shape. In other contemplated embodiments, rail 108a may have a first shape while rail 108b may have a second shape different from rail 108a. It should be understood that rails 108a and 108b house at least a wire harness or other component/set of componentry that accommodates one or more electrical wires/cabling that in part, makes up a bus bar module (as described above). FIG. 3 illustrates an example wire harness 108c of rail 108b. Rail 108a may have a corresponding wire harness.

Rails 108a and 108b of battery pack assembly 100 may further comprise one or more sensors, e.g., voltage and/or temperature sensors in the form of wires/lines aggregated and/or positioned throughout each of rails 108a and 108b for sensing the voltage and temperature of each of battery cells 104a-104g(not shown in FIG. 3A). As described above, these voltage and temperature sensors may be detection lines, although other contemplated embodiments are not so limited, and may take the form of other currently or future-known sensors.

Battery pack assembly 100 may further comprise a lid 106 that may be held in place by one or more fasteners (an example of which is fastener 112). By virtue of fastener 112 holding lid 106 in place, lid 106 is in turn, able to hold battery stack 102 within battery stack case 102. Lid 106 may be a rigid lid having a hollow interior to allow lid 106 to have the requisite strength to hold battery stack 102 in place while also allowing air to flow through lid 106 to cool/maintain a desired operating temperature of battery cells 104a-104g. Fastener 112 may be a screw, bolt, latch, or other mechanism (known now or in the future) for holding lid 106 in place as described above. It should be understood that the embodiment illustrated in FIG. 3 comprises a substantially rectangularly-shaped lid 106, but in other contemplated embodiments, may take on another shape. The size, e.g., width, length, and/or depth of lid 106 can also vary in accordance with desired operating characteristics. For example, the volume of the interior hollow region of lid 106 may be larger to accommodate greater airflow. The volume can be increased in accordance with one or more of the width, length, and depth. Moreover, the distance between lid 106 and the upper or top portion/surface of battery stack 102 can also vary.

As can be appreciated, upon removal of lid 106 from its holding position, any one or more of battery cells 104a-104g can be removed from battery stack 102. Similarly, one or more new battery cells (not shown) can be placed into battery stack case 102a to complete battery stack 102 when one or more old, non-operational battery cells are removed. In one embodiment, lid 106 may be completely removed after removal of fastener 112. In another embodiment, the engagement between lid 106 and battery stack 102 may be loosened by loosening fastener 112, thereby allowing lid 106 to be swung away from battery stack 102 along the plane defined by the upper surface of battery stack 102. In yet another embodiment, fastener 112 may be hinge or hinge-link mechanism, where disengagement of fastener 112 allows lid 106 to be swung up and away (perpendicularly) from the surface of battery stack 102 allowing access to battery cells 104a-104g and/or spaces within battery stack 102 for accepting new battery cells.

In particular, the L-shaped configuration of each of terminals 104a-1, 104b-2, 104c-1, 104d-2, 104e-1, 104f-2, and 104g-1 (and the corresponding second terminals of battery cells 104a-104g) allows each of battery cells 104a-104g to be engagingly connected (by friction) to/ with and/or disconnected from the corresponding terminal connectors 108b-1 to 108b-7 of rail 108b (and those of rail 108a). This can be accomplished by lifting/dropping a battery cell 104a-104g from/into its position in battery stack 102. Thus, unlike the conventional battery pack configurations described above (and illustrated in FIG. 2B, for example), each and every bolt connecting each and every terminal need not be removed or replaced/re-tightened. It should be understood that once connected via corresponding terminal connectors, a battery cell, e.g., any one of battery cells 104a-104g, may be electrically connected to the bus bar module housed in rail 108a and the bus bar module housed in rail 108b. These bus bar modules may be embodiments of bus bar module 60 described above. In this way, the electrical energy output by each of battery cells 104a-104g can be properly/appropriately distributed therefrom.

Figure 3B:
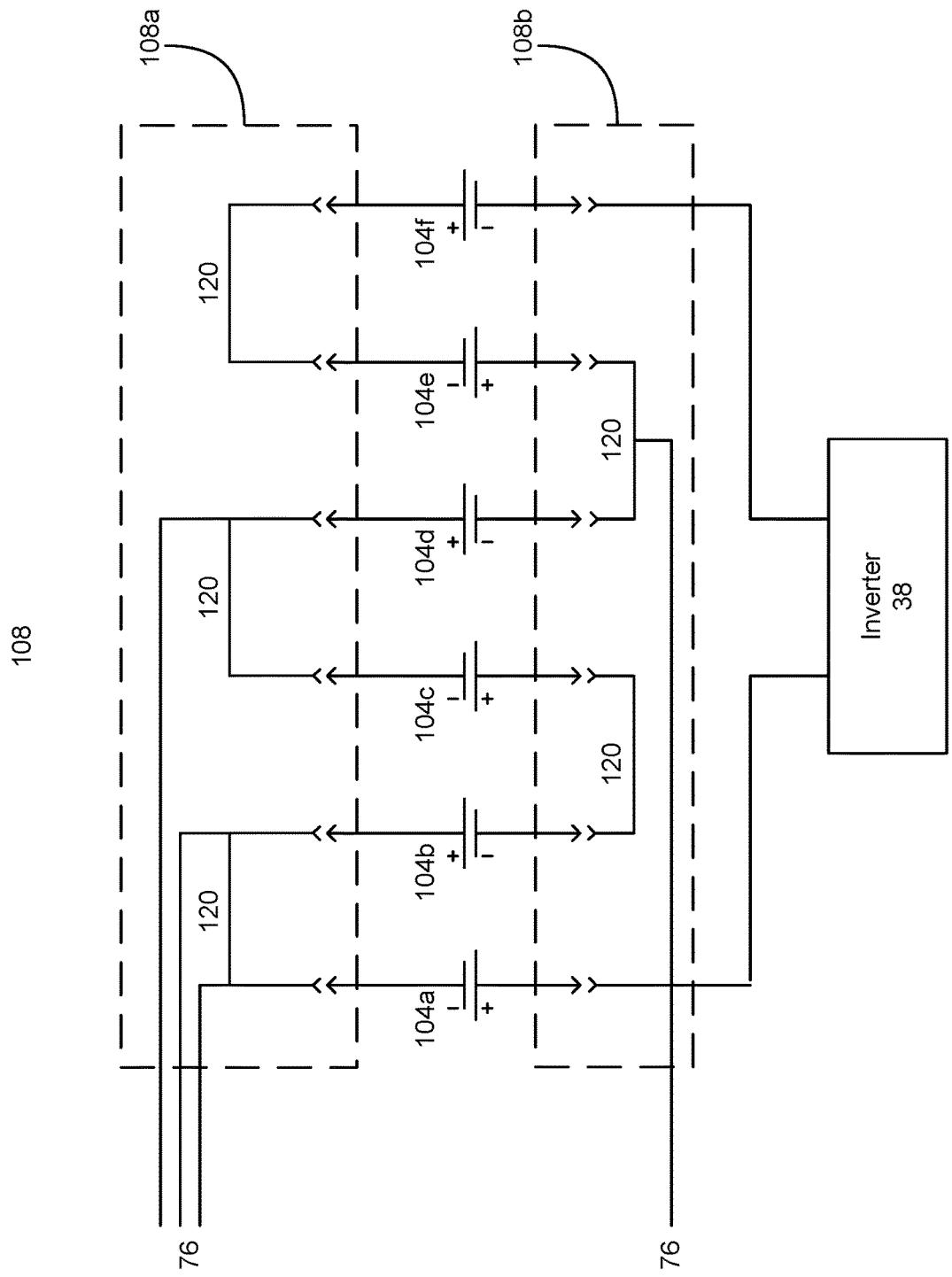
FIG. 3B illustrates an example bus bar operatively connected to the example battery pack of FIG. 3A in accordance with one embodiment of the disclosed technology.

FIG. 3B illustrates an electrical representation of an example bus bar module 108 which may be housed by/comprise rails 108a and 108b in accordance with some embodiments. Detection lines 76 may be, for example, and as described above, voltage detection wires used to sense voltage and/or temperature of each battery cell, in this example battery cells 104a-104f, and may be connected to one or more of sleeves/clips 120 which may make up a terminal connector, such as terminal connectors 108b-1 to 108b-6. Further illustrated in FIG. 3B are sleeves/clips 120 (described in greater detail below) that act as terminal connectors operatively engaging the positive and negative terminals of each of battery cells 104a-104f. As illustrated in FIG. 3B, battery cells 104a-104f are connected in series, with a positive terminal of one battery cell being electrically connected to a negative terminal of another battery cell, and so on. As noted above with respect to FIG. 1, electric power delivered from or to MGs (e.g., MGs 32 and 34) passes through inverter 38 to battery 36, where battery 36 is embodied by a battery stack comprising battery cells 104a-104f, in this example. Batteries are series-connected and connectors 120 are just to connect positive to negative terminals to connect "series." In some embodiments rails 108a and 108b may injection-molded rails, stamped out steel rails, or take on other known configurations for supporting sleeves/clips 120 that make up the terminal connectors.

Figures 4A, 4B:
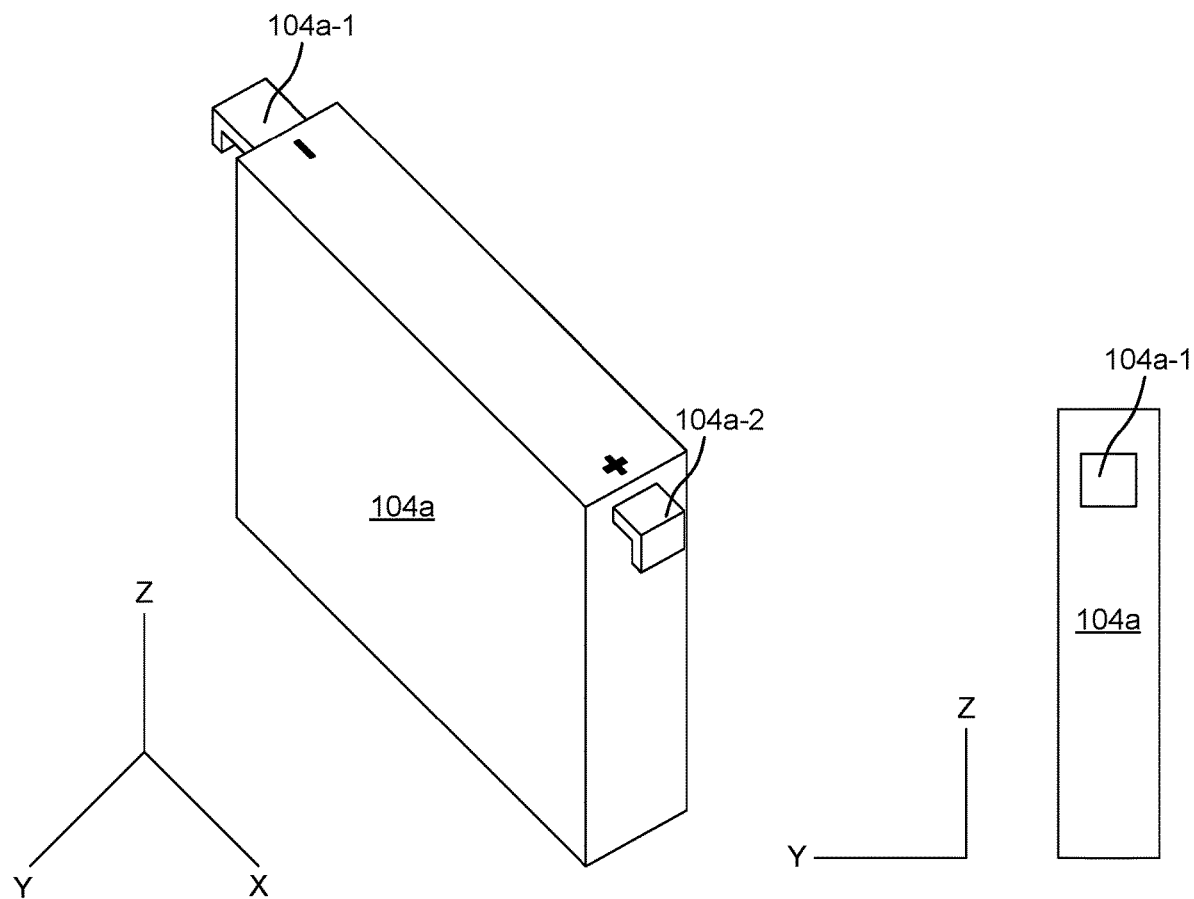
FIG. 4A is a perspective view of an example battery in accordance with one embodiment of the disclosed technology.
FIG. 4B is a frontal view of the example battery of FIG. 4A
Figure 4C:
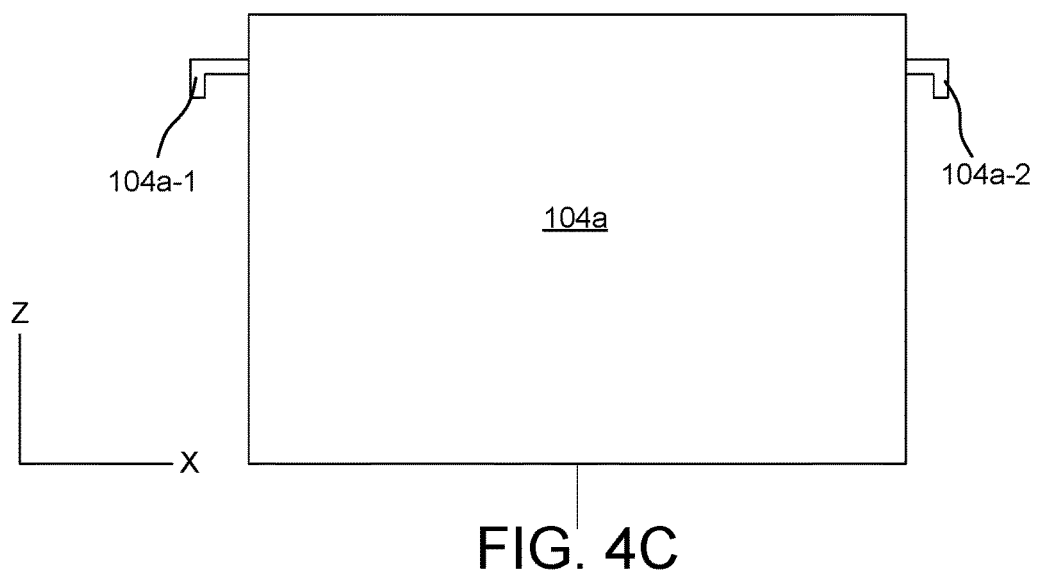
FIG. 4C is a side view of the example battery of FIG. 4A.

FIG. 4A illustrates a perspective top view of an example battery cell 104a that may be used to make up battery stack 102 in isolation. 4B illustrates a frontal view of battery cell 104a and its terminal 104a-1 for additional perspective. FIG. 4C illustrates a side view of battery cell 104a and its terminals 104a-1 and 104a-2 for still other perspective. As illustrated in FIG. 3, battery cell 104a may comprise an L-shaped terminal 104a-1. In this embodiment, terminal 104a-1 may be the negative terminal of battery cell 104a. Correspondingly, battery cell 104a may have a second, positive, terminal 104a-2.

Terminals 104a-1 and 104a-2 are positioned at or about the upper portion of battery cell 104a, and each protrudes in a opposite directions of the plane defined by the top surface of battery cell 104a, i.e., perpendicular to the direction in which battery cell 104a is stack with the other battery cells (104b-104g) of battery stack 102. That is, terminals 104a-1 and 104a-2 protrude along the X-axis while battery cell 104a is stacked along the Y-direction. In this way, battery cell 104a can be fit (as part of battery stack 102) into battery case 102a, while still being able to be engagingly connected to the corresponding terminal connectors of rails 108a and 108b.

It should be understood that in the embodiments disclosed (and illustrated herein) each terminal 104a-1 and 104a-2 of a battery cell, e.g., battery cell 104a, have a substantially L-shaped configuration. However, in other contemplated embodiments, the terminals may have a more curved or, e.g., C-shaped, configuration. In still other contemplated embodiments, the terminals may have a downward-facing V-shaped configuration. That is, the shape of the terminals of a battery cell, in accordance with various embodiments, may be shaped to allow for engagement with a terminal connector of a rail by way of lifting or moving the battery cell towards/away from a battery stack.

In still other contemplated embodiments, the shape of terminal 104a-1 may differ from the shape of terminal 104a-2. In other contemplated embodiments, the shape may be the same or different, and the relative sizes of terminals 104a-1 and 104a-2 may also differ. For example, in the embodiment illustrated in FIGS. 4A and 4B, the width (along the Y-direction) of terminal 104a-1 may be greater than that of terminal 104a-2. Terminals 104a-1 and 104a-2 can be configured in this manner to allow for easy identification of polarity and/or to prevent reverse-polarity installation of battery cell 104a into battery stack 102. Other variations of this are also contemplated. For example, terminal 104a-2 may be wider than terminal 104a-1, terminal 104a-1 may be longer (in the X-direction) that terminal 104a-2, etc.

Figure 4D:
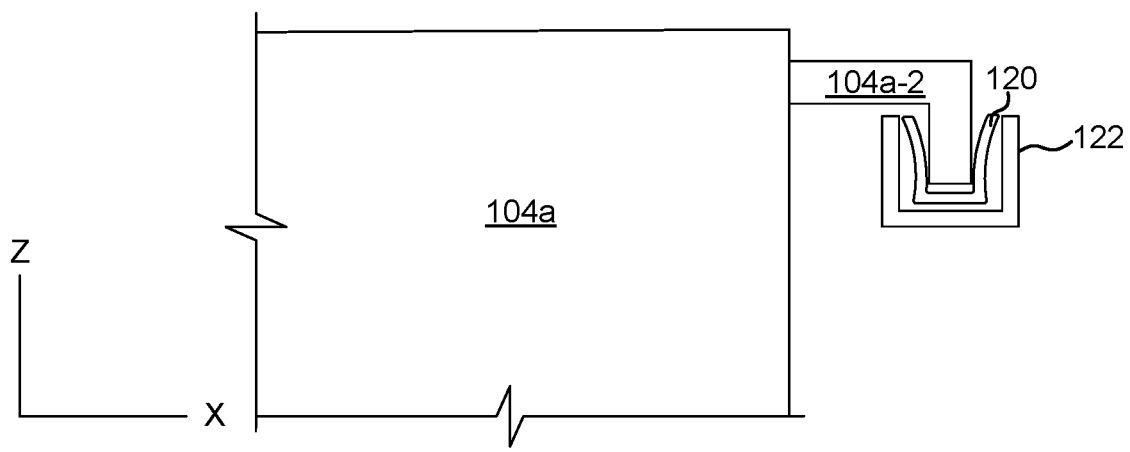
FIG. 4D is a side view of a terminal and a corresponding connector clip in accordance with one embodiment of the disclosed technology.
Figure 4E:
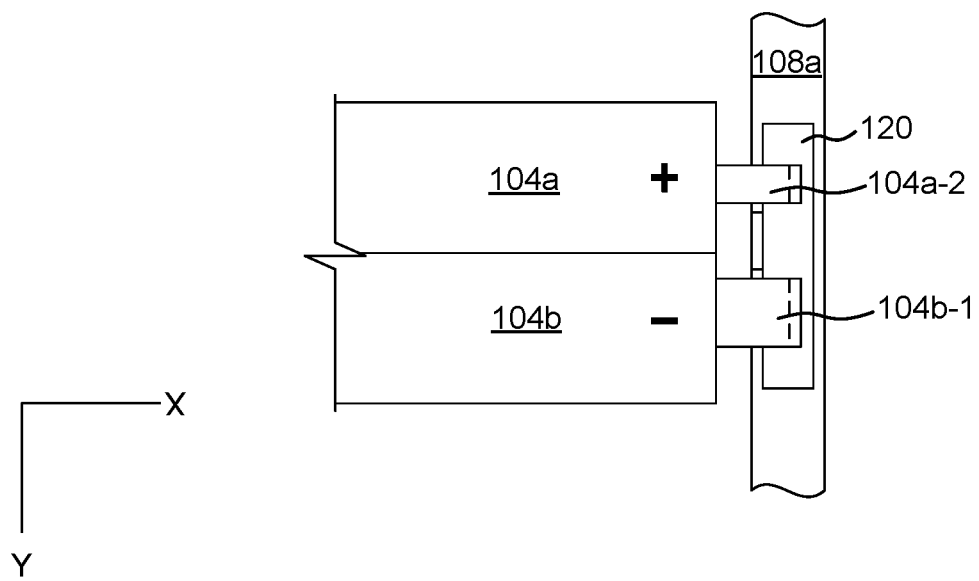
FIG. 4E is a top view of a plurality of batteries operatively connected to a rail in accordance with one embodiment of the disclosed technology.

FIG. 4D is a close-up side view of battery cell 104a and one of its terminals 104a-2 operatively connected to a terminal connector 108a-2 of rail 108a. In this embodiment, again, terminal 104a-2 is substantially L-shaped. A first portion or end of terminal 104a-2 connects to/is positioned proximate to one side of battery cell 104a (that side which faces rail 108a when battery cell 104a is stacked as part of battery stack 102. A second portion or end of terminal 104a-2 is configured perpendicularly (e.g., at a 90 degree angle down, in the Z-direction) relative to the first portion or end of terminal 104a-2. This second portion or end of terminal 104a-2 engages with terminal connector 108a-2 of rail 108a. As will be described in greater detail below, terminal connector 108a-2 may comprise a clip or sleeve 120 and a retainer or over-mold 122 that is part of rail 108a for supporting clip/sleeve 120. In one embodiment, clip/sleeve 120 may be constructed of spring steel or a similar material that can provide frictional tension. In one embodiment, retainer/over-mold 122 may be made of a resin or similar material. In one embodiment, retainer/over-mold 122 substantially encloses or covers the outer surfaces of clip/sleeve 120, and can act as an insulator if rail 108a is made of a material such as steel that can conduct electricity FIG. 4E illustrates a close-up top view of battery cells 104a and 104b. This view illustrates terminal 104a-2 (the positive terminal of battery cell 104a) engaging clip 120. Adjacent to terminal 104a-2, is terminal 104b-1 (the negative terminal of battery cell 104b). Again, in one embodiment, the negative terminal of a battery cell may be wider than the positive terminal of the battery cell to prevent reverse-polarity installation of the battery cell. By virtue of being retained by clip 120, a user, e.g., mechanic or owner, can simply lift a battery cell, e.g., battery cell 104a, from its position in battery stack 102, to remove it from battery stack 102. The user may also simply drop or push in a battery cell, e.g., battery cell 104b into position in battery stack 102, to install it in battery stack 102. The clip 120 effectuates an electrical connection of terminal 104a-2 to rail 108a (and therefore, the battery cell to which the terminal is attached to or protrudes from, i.e., battery cell 104a) by friction. It should be understood that this frictional engagement may also provide some level of retention (that is in addition to/adds to the retention provided by lid 106 that acts to hold each battery cell 104a-104g of battery stack 102 in place and within battery stack case 102a).

Figure 4F:
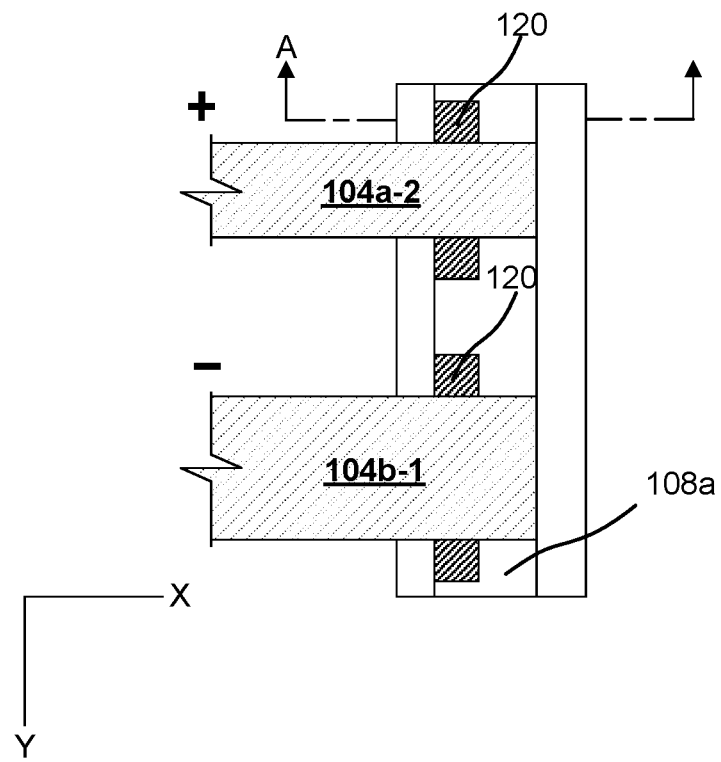
FIG. 4F is a detailed top view of the plurality of batteries operatively connected to the rail of FIG. 4D.
Figure 4G:
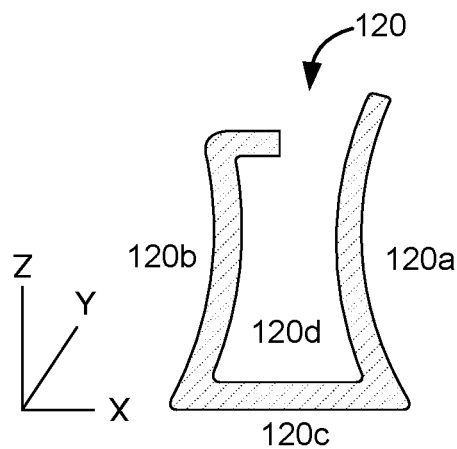
FIG. 4G is a side view of an example connector clip in accordance with one embodiment of the disclosed technology.

FIG. 4F illustrates a more detailed view of terminals 104a-2 and 104b-1 connected to the respective clips/sleeves 120 of terminal connectors 108a-1 and 108b-1. FIG. 4G illustrates a cross-sectional view of an example clip/sleeve 120. Clip/sleeve 120 may have a substantially rectangular cross-section, where a first side 120a is convex in shape relative to an inner region 120d defined, in part, by the first side 102a of clip/sleeve 120. Similarly, a second side 120b of clip/sleeve 120 is also convex in shape relative to the inner region 120d, where the convex portions of the first and second sides 120a, 120b face each other and the inner region 120d of clip/sleeve 120. First and second sides 120a, 120b of clip/sleeve 120 may be joined by a third side 120c that spans inner region 120d. In one embodiment, the second side 120b of clip/sleeve 120 may be relatively shorter in length compared to the length of the first side 120a. Moreover, one end of the second side 120b of clip/sleeve 120, distal from the third side 120c, may, in one embodiment, be angled or bent (at about 90 degrees) towards the inner region 120d. The convex portions of the first and second sides 120a, 120b provide frictional force against the second portion or end of a terminal. Additionally, the angled or bent portion of the second side 120b of clip/sleeve 120 provides a semi-enclosed region (that includes the inner region 120d) defining a space to receive the second portion or end of the terminal. In one embodiment, the semi-enclosed region further prevents or at least, inhibits lateral (in the Y-direction) movement of a terminal when connected to a terminal connector. In some embodiments, clip/sleeve 120 may be approximately 0.5 cm wide (in the X direction), 2.5 cm long (in the Y direction), and 1 cm high (in the Z direction). It should be noted that these dimensions can vary depending on one or more desired characteristics of the battery pack, e.g., the number of battery cells making up the battery stack and a desired overall footprint of the battery pack assembly, the size of the bus bar in which clip/sleeve is positioned, etc.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and/or other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A battery pack assembly, comprising:
a battery stack case having a first wall on a first side and a second wall on a second side;
a battery stack comprising a plurality of battery cells configured such that each of the plurality of battery cells substantially abuts at least one neighboring battery cell, the battery stack being housed within the battery stack case wherein each of the plurality of battery cells comprises two terminals, each of the two terminals extending from opposite sides of each of the plurality of battery cells;
a first rail disposed on the first wall of the battery stack case; and
a second rail disposed on the second wall of the battery stack case, wherein the first rail and the second rail each comprise a plurality of terminal connectors respectively corresponding to a first and second set of terminals, the plurality of terminal connectors frictionally engaging the first and second sets of terminals along a same axis of movement, and distributing electrical energy from each of the plurality of battery cells to at least one system of a vehicle within which the battery pack assembly is installed.

2. The battery pack assembly of claim 1, further comprising a hollow lid adapted to retain the battery stack within the battery stack case and effectuate airflow about the plurality of battery cells.

3. The battery pack assembly of claim 2, wherein the hollow lid is removably attached to the battery stack case, such that removal of the hollow lid allows for singular disengagement of the two terminals of any of the plurality of battery cells of the battery stack from their corresponding terminal connectors, and singular engagement of two terminals of a new battery cell with their corresponding terminal connectors.

4. The battery pack assembly of claim 3, wherein each of the first and second rails comprises a bus bar module through which the distribution of electrical energy from each of the battery cells occurs.

5. The battery pack assembly of claim 3, wherein each of the first and second rails comprises at least one sensor detecting a temperature of one of the plurality of battery cells.

6. The battery pack assembly of claim 3, wherein each of the first and second rails comprises at least one sensor detecting a voltage of one of the plurality of battery cells.

7. The battery pack assembly of claim 4, wherein the bus bar module comprises a wire harness.

8. The battery pack assembly of claim 3, wherein the first rail comprises a retainer portion housing each said corresponding terminal connector corresponding to one of the two terminals of each of the plurality of battery cells, and wherein the rail second rail comprises a retainer portion housing each said corresponding terminal connector corresponding to another one of the two terminals of each of the plurality of battery cells.

9. The battery pack assembly of claim 1, wherein each said corresponding terminal connector comprises a clip adapted to receive one of each of the two terminals of each of the plurality of battery cells.

10. The battery pack assembly of claim 9, wherein the clip comprises at least three sides defining a region there between for receipt of the one of each of the two terminals of each of the plurality of battery cells.

11. The battery pack assembly of claim 10, wherein first and second sides of the at least three sides oriented opposite each other are convex to provide the frictional engagement.

12. The battery pack assembly of claim 11, wherein the first side is shaped to maintain the frictional engagement in an axis of direction perpendicular to a direction of movement effectuating the frictional engagement.

13. The battery pack assembly of claim 1, wherein a shape of each of the two terminals of each of the plurality of battery cells is substantially an L-shape, wherein a first end of each of the two terminals mates with its corresponding terminal connector to effectuate the frictional engagement.

14. The battery pack assembly of claim 1, wherein each of the two terminals protrudes from an upper portion of each of the plurality of battery cells opposite each other along a first axis, and a first end of each of two terminals mating with its corresponding terminal connector is angled along a second axis substantially perpendicular to the first axis.

15. The battery pack assembly of claim 1, wherein a first of the two terminals is wider than a second of the two terminals.

16. A battery pack assembly, comprising:
a battery stack case; and
a battery stack housed within the battery stack case, wherein an upper portion of the battery stack remains exposed, the battery stack comprising a plurality of battery cells, each battery cell comprising a positive terminal and a negative terminal, wherein
the positive and negative terminals of a battery case alternate along each side of the battery stack, wherein each of the positive and negative terminals of each of the plurality of battery cells protrudes from an upper portion of each of the plurality of battery cells and is angled towards the battery stack case and away from a lid of the battery stack case, wherein the battery stack case further comprises a first rail disposed on a first wall, and a second rail disposed on a second wall, and wherein the first wall and second wall are disposed on opposite sides of the battery stack case, the rail comprising a plurality of terminal connectors adapted to frictionally engage each of the positive and negative terminals of each of the battery cells.

17. The battery pack assembly of claim 16, wherein the lid of the battery stack case further comprises a rigid, hollow lid adapted to retain the battery stack within the battery stack case and provide air flow to each of the plurality of battery cells.

18. The battery pack assembly of claim 16, wherein the rail further comprises a bus bar module adapted to distribute electrical energy from each of the battery cells to one or more vehicle systems.

19. The battery pack assembly of claim 16, wherein the rail further comprises at least one voltage sensor and at least one temperature sensor adapted to sense voltages and temperatures associated with each of the plurality of battery cells.

\* \* \* \* \*